Jan. 20, 1942.   C. W. GINTER   2,270,754
BEARING PACKER
Filed Nov. 4, 1940
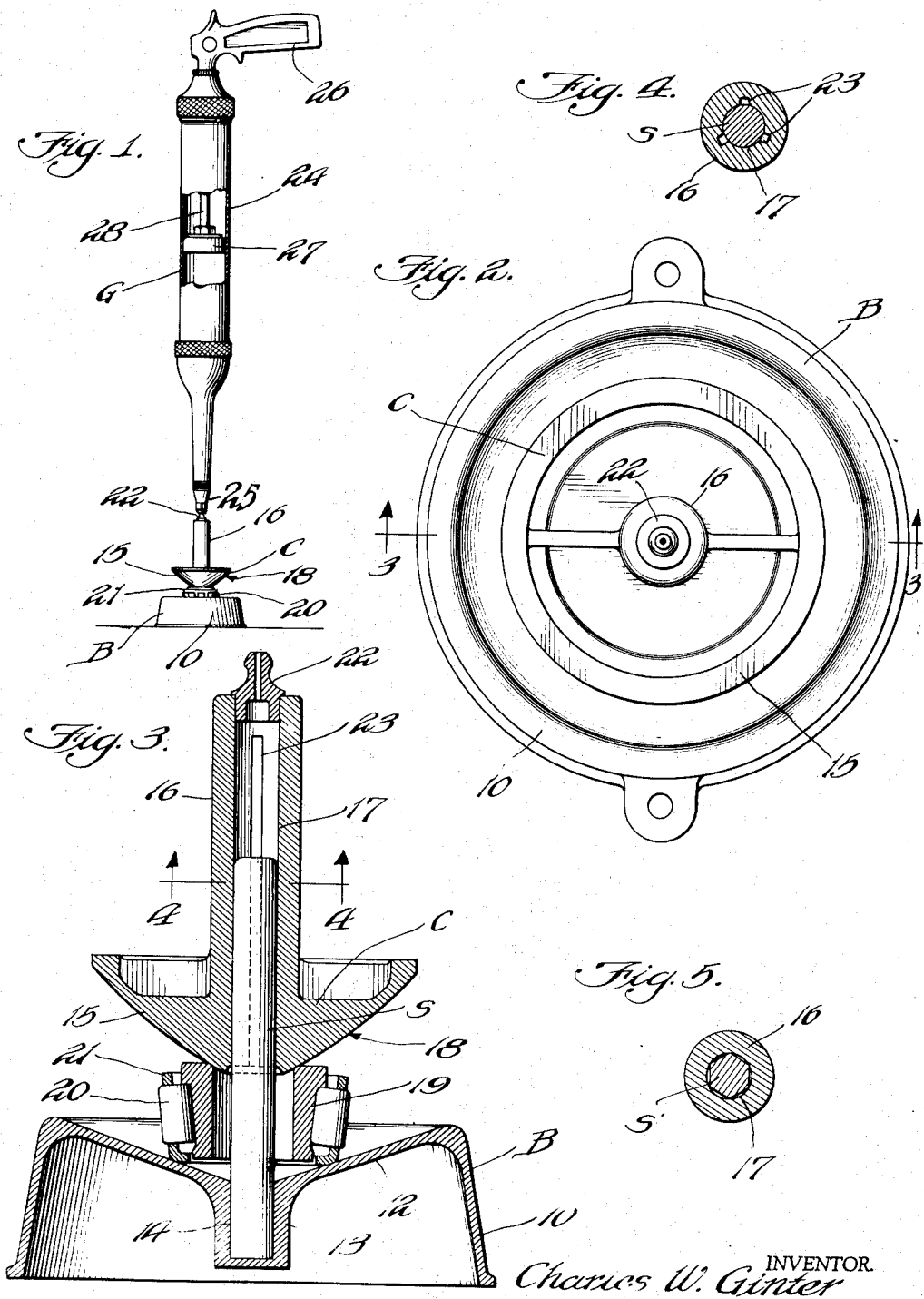
INVENTOR.
Charles W. Ginter
BY Bair & Freeman
ATTYS.

Patented Jan. 20, 1942

2,270,754

UNITED STATES PATENT OFFICE 2,270,754

BEARING PACKER

Charles W. Ginter, Bryan, Ohio, assignor to The Aro Equipment Corporation, Bryan, Ohio, a corporation of Ohio Application November 4, 1940, Serial No. 364,258

9 Claims. (Cl. 184—1)

My present invention relates to a lubricating device particularly adapted for bearing assemblies such as roller bearings, ball bearings and the like.

One object of the invention is to provide means to seal the ends of a bearing particularly the cage and inner race of the bearing in such manner that lubricant can be introduced into the interior of the bearing and made to flow under pressure into the spaces between the bearings, the outer surface of the inner race and the inner surface of the cage so as to lubricate all parts thereof and thus prepare the bearing for subsequent association with the outer race for the bearing.

Another object is to provide a structure of the general character mentioned wherein the number of parts is reduced to a minimum consisting merely of a bottom seating member having a projecting stem and an upper closure member freely slidable on the stem.

Still another object is to provide the closure member without means to hold it in engagement with the bearing other than the mere pressure of a lubricant gun against the closure member whereby clamps, screw threaded connections, spring holding devices and the like are entirely eliminated with my arrangement.

A further object is to provide a closure member having a bore slidable on the stem with means to receive lubricant into the bore and to pass the lubricant along the stem into the interior of the bearing.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a side elevation of my bearing packer showing it in use with a pressure lubricant gun associated therewith to accomplish the bearing packing operation.

Figure 2 is an enlarged plan view of the bearing packer per se.

Figure 3 is a vertical sectional view thereof on the line 3—3 of Figure 2.

Figure 4 is a sectional view on the line 4—4 of Figure 3.

Figure 5 is a similar sectional view showing a slight modification.

On the accompanying drawing my bearing packer comprises essentially a base B, a stem S, and a closure member C. The base B consists of a tubular supporting flange 10, an inwardly and downwardly sloping conical supporting flange 12, and a central depending hub 13. The stem S may consist merely of a round rod pressed into a bore 14 in the hub 13 whereby the stem is rigidly mounted in an upwardly extending position with respect to the center of the seating flange 12.

The closure member C consists of a head 15 having an elongated hub 16 provided with a bore 17. The head 15 has a conical lower face 18 adapted to engage the inner race 19 of a bearing assembly. The bearing assembly illustrated includes rollers 20 and a cage 21.

The bearing shown on the drawing is merely for the purpose of illustration, whereas my structure is adapted to lubricate ball bearings including both the inner and outer races thereof, thrust bearing assemblies and equivalent types of bearing assemblies.

The upper end of the bore 17 is adapted to receive an inlet nozzle 22 which is shown as a press fit into the bore. The bore 17 may be provided with means such as grooves 23 broached therein for permitting passage of lubricant downwardly through the bore past the stem S.

Figure 5 as an alternate construction, shows a stem S' of polygonal rather than round cross section with the bore 17 of the hub 16 round for sliding movement on the stem S'. Due to the difference in the polygonal and round shapes, space is provided along the flat sides of the polygon for passage of the lubricant.

My bearing packer is particularly adapted for use in connection with a grease gun G having the usual pressure barrel 24, discharge nozzle 25 and operating handle 26. The handle 26 is adapted for placing grease within the barrel 24 under pressure as by forcing a piston 27 connected by a piston rod 28 to the handle 26 against the lubricant in the barrel.

In operation the bearing is placed over the stem S while the closure member C is removed. The closure member C is then placed on the stem S and the gun G is then positioned with its nozzle 25 against the nozzle 22; three very simple steps.

Thereafter it is merely necessary to place the contents of the barrel 24 under pressure which expels the grease into the interior of the bearing.

Such operation causes a downward pressure on the nozzle 25 which is effective to hold the closure member C in sealing engagement with the inner race 19 of the bearing and to hold the cage member 21 properly seated against the seating flange 12. Such proper seating is insured by the central or axial location of the member C relative to the base B effected by guiding coaction of the stem S with respect to the closure member C.

In this manner I eliminate the necessity of any type of clamping device for the member C relative to the member B.

The lubricant first fills the race 19, then engages the seat 12 and finally passes into the spaces between the race 19 and the cage 21 and around the rollers 20. When the lubricant begins to squeeze out around the rollers through the slots therefor in the cage 21 and overflow from the spaces above the rollers between the elements 19 and 21, the operator knows that the bearing has been sufficiently lubricated and can release pressure on the gun G. Thereafter, the gun and the closure member C may be removed whereupon the lubricated bearing member may be removed from the stem S and placed into its outer race with assurance that the bearing will be sufficiently lubricated throughout with enough surplus lubricant to lubricate the shaft or spindle on which the bearing is mounted and the surrounding interior of the bearing housing.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a bearing packer apparatus, a seat affording a support for a bearing to be lubricated, a guide stem extending upwardly therefrom through the bearing, means slidable on said guide stem for closing the end of the bearing remote from said seat, said means including a conduit in communication with a lubricant dispenser providing a source of lubricant under pressure remote from the seat, said means being adapted to clamp the bearing in cooperative relation with the seat under pressure of said lubricant dispenser against said means.

2. A bearing packer device comprising a member having a substantially central guiding stem, a surface surrounding said stem and adapted to uniformly contact with one side of a bearing assembly, a clamping element having a substantially conical surface adapted to contact with the opposite side of said bearing assembly, said clamping element being guided on said stem and having a hollow portion adapted to receive lubricant to be dispelled along the stem into the bearing between said surface and said clamping element, said clamping element being freely slidable on said stem and having means at its upper end for contact engagement with the discharge nozzle of a lubricant gun whereby the pressure of the gun against the clamping element effects seating thereof on the bearing and seating of the bearing against said surface during the introduction of lubricant to the bearing.

3. In a device for applying fluid under pressure to bearings, means for holding fluid, a support adapted to receive an annular bearing, a stationary stem extending upwardly from said support, a bearing clamping element mounted on said stationary stem for free longitudinal adjustment relative thereto to accommodate different thicknesses of bearings and means for introducing fluid under pressure from said means for holding the fluid to said bearing clamping element for discharge to the interior of the bearing and for holding the clamping element against the bearing under force of said means for holding fluid during its operation.

4. A device for forcing lubricant between the body and cage of a bearing assembly having a central opening comprising an indented seating member adapted to engage the cage of said bearing assembly, a guide stem extending upwardly from said seating member, a closure member for the upper end of the bearing assembly, said closure member having a bore adapted to receive lubricant from a lubricant gun engaged with the upper end of the closure member, said closure member, under the force of such engagement, effecting a seal between said seating member and said cage and between said closure member and the inner race of the bearing.

5. A device for forcing lubricant into the space between the elements of a hollow bearing assembly embodying a concave seating member adapted to engage one element thereof and thereby support the bearing assembly, means opposite said seating member for closing the passage through the bearing assembly and holding the bearing assembly on said seating member and means for forcing lubricant into said last means and for holding said last means in engagement with the bearing assembly, said seating member having a guide stem extending through the bearing and slidably into a bore of said closing means and a passageway between said guide stem and the inner surface of said bore to permit passage of lubricant from the bore above the stem, along the stem and into the bearing assembly.

6. A bearing member lubricator comprising a base member having a dished seating surface for one end of a bearing assembly, said base member having an upwardly extending guide stem, means slidably mounted on said guide stem and engaging the other end of the bearing assembly for clamping said bearing in place on said seating flange, said last means being adapted for positive manual engagement with the bearing and means for introducing lubricant under pressure into said last means while it is being manually held in engagement with the bearing.

7. A lubricating device for bearing assemblies comprising a body member having an annular dished flange at its upper end, a guide stem extending upwardly therefrom, a lubricant reservoir from which lubricant is adapted to be discharged under pressure and a closure member for the bearing interposed between the bearing and the lubricant reservoir and adapted to be engaged with the bearing by pressure of the lubricant reservoir against said closure means, said closure means having a bore receiving said guide stem.

8. A lubricating device for bearing assemblies comprising a bearing supporting member including a dished base member and a centrally and vertically disposed stem mounted rigidly with respect to said base member, a conical bearing closure member slidably mounted on said stem for engaging the upper end of the bearing assembly to hold the same on said base member during the lubricating operation, said conical member being hollow for the reception of lubricant and being adapted to seal the central opening of the bearing against discharge of lubricant therefrom by pressure of a lubricant gun against said conical member, said conical member having a passageway for affording hydraulic communication between such gun and the hollow interior of said conical member.

9. An apparatus for lubricating bearing assemblies comprising in combination a bowl-shaped element having a circular outwardly flaring face, a stem secured to the center of said element and extending axially relative to the circular flaring face thereof, a closure element mounted on said stem for free sliding longitudinal advancement toward said first mentioned element with a face of the second mentioned element disposed opposite said flaring face on said first mentioned element, said faces of said elements being adapted to engage annular edges on opposite sides of a bearing assembly and to form in conjunction therewith a sealed chamber from which lubricant contained therein can only escape by way of the clearances in the bearing assembly thus engaged and a lubricant reception nozzle on one of said elements for pressure contact with the discharge nozzle of a lubricant dispensing device for admitting lubricant under pressure sufficient to cause the lubricant to fill said chamber and escape therefrom by way of the clearances in the bearing assembly engaged by said elements and for effecting sealing engagement of said one of said elements with the bearing, and the bearing with the other element, by the pressure of said discharge nozzle against said reception nozzle.

CHARLES W. GINTER.